Aug. 1, 1961

D. E. GRISWOLD 2,994,814

PROCESS CONTROLLER

Filed May 4, 1956

INVENTOR

David E. Griswold

BY Bacon & Thomas

ATTORNEYS

Aug. 1, 1961 D. E. GRISWOLD 2,994,814
PROCESS CONTROLLER
Filed May 4, 1956 5 Sheets-Sheet 2

INVENTOR.
David E. Griswold
BY Bacon & Thomas
ATTORNEYS

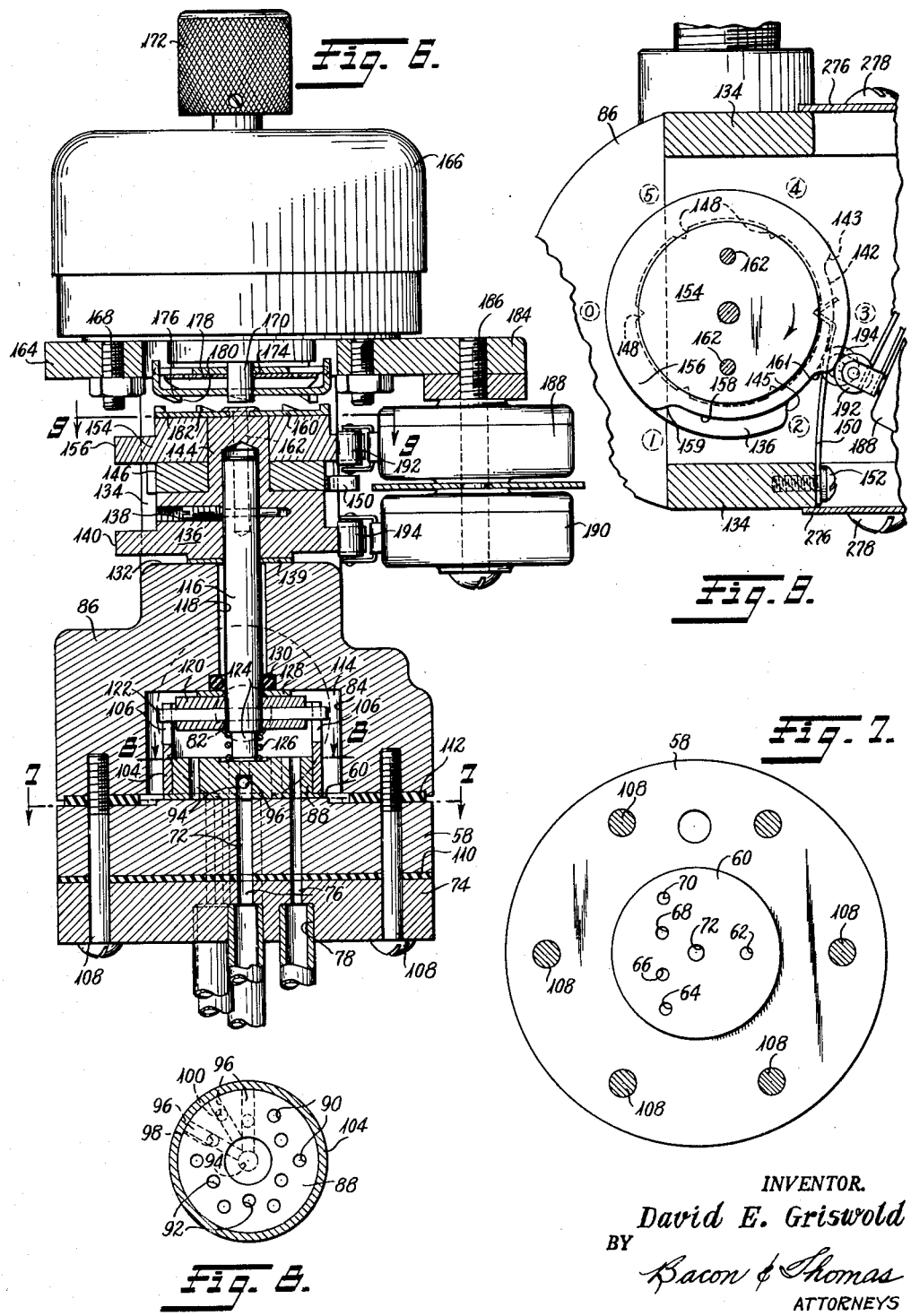

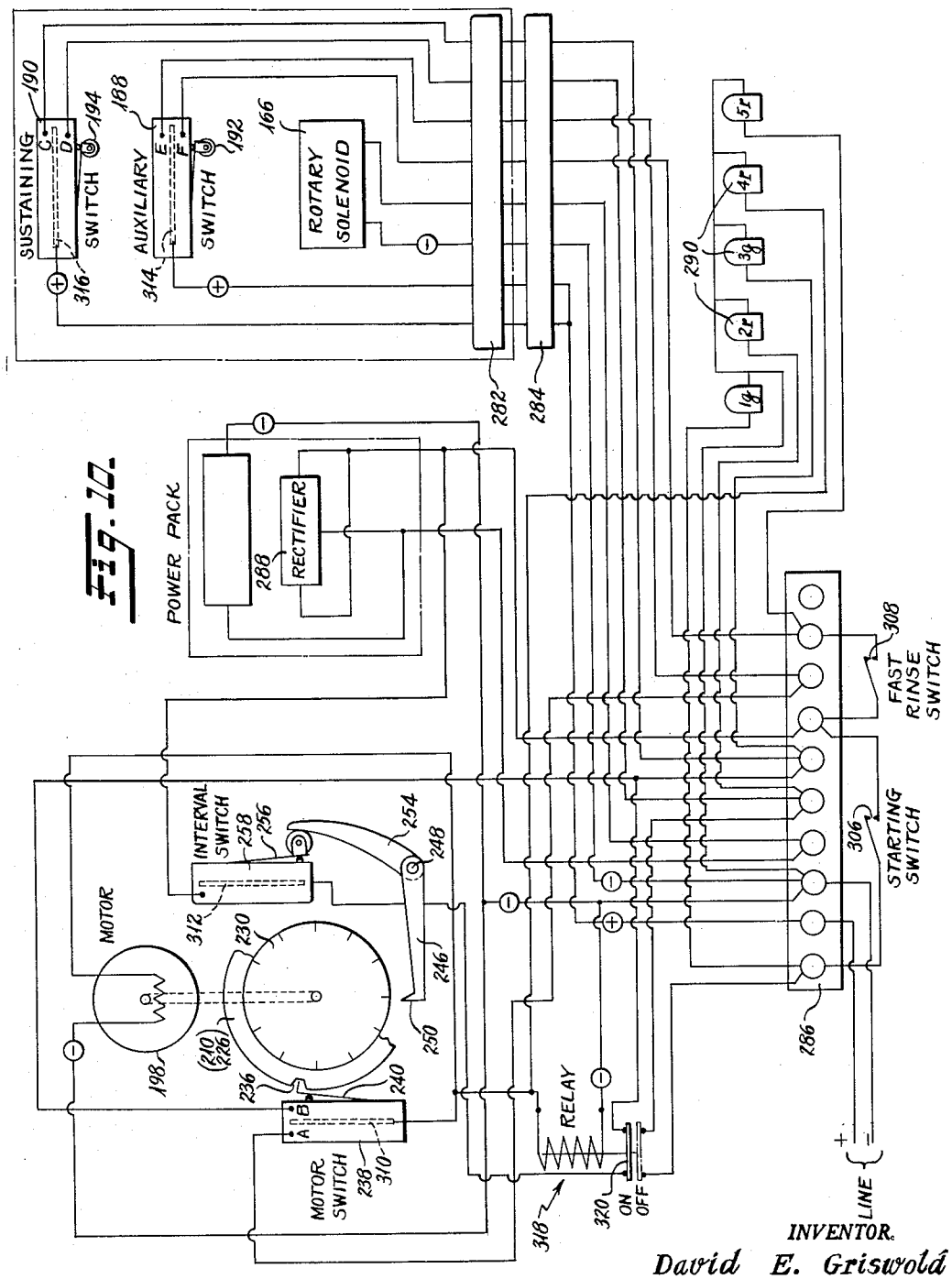

Aug. 1, 1961  D. E. GRISWOLD  2,994,814
PROCESS CONTROLLER
Filed May 4, 1956  5 Sheets-Sheet 5

Fig. 11.

| PILOT POSITION | OPERATION | VALVES | | | | | | MOTOR AND RELAY | MOTOR SWITCH | SUSTAINING SWITCH | AUXILIARY SWITCH | STARTING SWITCH | FAST RINSE SWITCH | INDICATOR LIGHTS | | | | |
|---|---|---|---|---|---|---|---|---|---|---|---|---|---|---|---|---|---|---|
| | | I | II | III | IV | V | VI | | | | | | | 1g. | 2r. | 3g. | 4r. | 5r. |
| 0 | SERVICE | OP. | | | OP. | | | OFF | B* | D | E | OPER. | INOP. | *ON | | ON | | |
| 1 | OFF | | | | | | | ON | A | C | E | INOP. | INOP. | | ON | | ON | |
| 2 | BACKWASH | | OP. | | | OP. | | ON | A | C | E | INOP. | INOP. | | ON | | ON | |
| 3 | OFF | | | | | | | ON | A | C | E | INOP. | INOP. | | ON | | ON | |
| 4 | REGENERATE | | | OP. | | | OP. | ON | A | C | E | INOP. | INOP. | | ON | | ON | |
| 5 | RINSE | OP. | | | | | OP. | OFF | A | C | F | INOP. | OPER. | | | | ON | ON |

* MOTOR SWITCH IS AT A AFTER PILOT REACHES O ¢ UNTIL PROGRAM TIMER COMPLETES CYCLE.
*1g OFF ¢ 2r ON WHEN MOTOR SWITCH 238 IS AT CONTACT A WITH PILOT IN O POSITION.

INVENTOR.
BY David E. Griswold
Bacon & Thomas
ATTORNEYS

United States Patent Office 2,994,814
Patented Aug. 1, 1961

2,994,814
PROCESS CONTROLLER
David E. Griswold, Newport Beach, Calif., assignor to Donald G. Griswold, Newport Beach, Calif.
Filed May 4, 1956, Ser. No. 582,887
5 Claims. (Cl. 318—467)

This invention relates to a process controller, and particularly to such a controller for controlling process-performing apparatus to cause the same to automatically perform a sequential series of operations according to a predetermined and timed program by supplying pressure fluid to a plurality of hydraulically-operated devices which, in turn, determine the ultimate sequence of operations of the apparatus.

By way of example, the description herein will refer specifically to the automatic control of water softening apparatus wherein a plurality of valves are controlled according to a predetermined program to backwash, regenerate, and rinse the water softening apparatus and to thereafter return the apparatus to normal service.

In general, the invention comprises means for hydraulically controlling the various valves to be manipulated at predetermined time intervals. A timing clockwork device is provided which, when put in operation, controls actuation of a pilot valve arranged to direct pressure fluid to or vent pressure fluid from selected distributing valves in the water softening system to control the circulation of water and/or brine through the softener in accordance with a predetermined timed schedule. The timing mechanism is arranged to create electrical pulses which are transmitted to a solenoid arranged to operate the pilot valve. Those pulses are transmitted at predetermined time intervals, which may be preselected and set. The controller also includes means for initially starting the timer to commence a cycle of operation and, in the specific embodiment described, includes further means for stopping the timer again at some predetermined position in the cycle until a further external control is manipulated to advance the pilot valve to the next position in its cycle and to again restart the timer for completion of its cycle.

The timer or timing mechanism includes features whereby the electric pulse delivered thereby is of very short duration to prevent damage to the solenoid. The invention also contemplates an automatically actuated pilot valve so constructed that it may be manually manipulated at any time, either to start an automatic cycle of operation or to advance the same through sequential steps of a cycle of operation in the event of power failure. The invention also includes features wherein the operation of the timer is automatically stopped when both the timer and pilot valve have completed a full cycle of operation. The pilot valve and solenoid unit are removable from the controller for replacement by other pilot valves to adapt the controller for the control of other and different apparatus.

The invention also includes features of novelty in the construction of the timing mechanism and in the construction of the pilot valve.

It is therefore a principal object of this invention to provide a controller for hydraulically-operated devices wherein a pilot valve is operable in response to a selective timer control in accordance with a predetermined program to actuate the pilot valve through sequential steps comprising one cycle of operation and provided with stopping and safety features responsive separately to the condition of the timer and of the pilot valve and also jointly responsive to the positions of both the pilot valve and timer.

Another object of this invention is to provide a device as set forth which is adapted to be selectively started manually or by automatic outside starting means.

Still another object is to provide a device as set forth adapted to simultaneously control or actuate a plurality of hydraulic devices.

A further object is to provide a control device as described including means for indicating the progress of a cycle of operation and to indicate each and every step thereof.

A still further object of the invention is to provide such a device as set forth above with safety features adapted to prevent undesired results upon inadvertent manipulation of one or more control elements.

Another further object is to provide a control device of the type set forth wherein a cycle of operation of the pilot valve cannot be electrically started unless the timer has completed a previous cycle.

Still another object is to provide a timing mechanism wherein the cycle of operation thereof may be manually accelerated.

An additional object is to provide means in such a controller to insure that the timer finishes its cycle of operation even though the cycle of operation of the pilot valve is first completed.

Other objects and advantages of the invention will become apparent to those skilled in the art as the description proceeds in connection with the accompanying drawings, wherein:

FIG. 3 is a sectional view taken through the device of FIG. 2 along the line 3—3 and showing the parts on a further enlarged scale;

FIG. 6 is an enlarged vertical sectional view through the pilot valve, taken on the line 6—6 of FIG. 2;

FIG. 7 is a sectional view taken on the line 7—7 of FIG. 6;

FIG. 8 is a sectional view taken on the line 8—8 of FIG. 6;

FIG. 9 is a horizontal sectional view taken along the line 9—9 of FIG. 6;

FIG. 10 is a schematic wiring diagram illustrating the manner in which the various components are electrically connected; and FIG. 11 is a chart showing the positions and conditions of varous parts at each step in a cycle of operation of the pilot valve.

Figure 1:
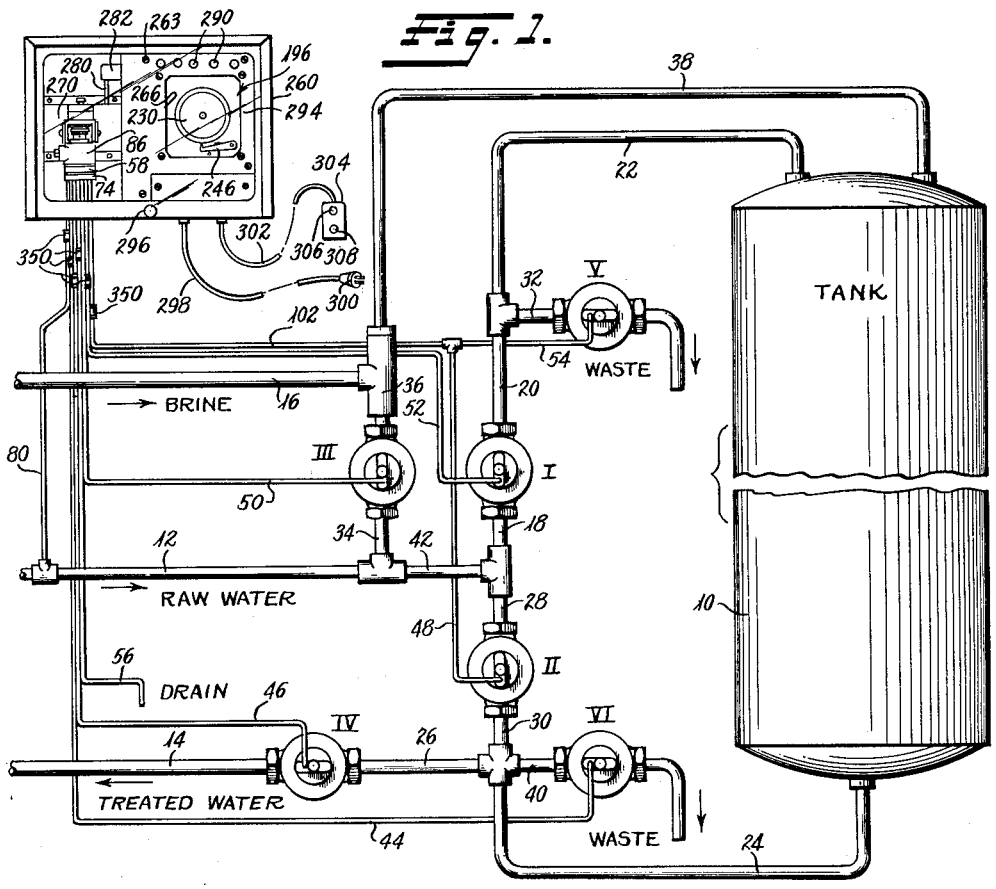
FIG. 1 is a schematic illustration of an apparatus controlled by a controller embodying the present invention.

Referring first to FIGS. 1 and 11, numeral 10 indicates a tank or other container constituting a water softening installation. It is contemplated that the tank 10 contain a suitable material to remove chemicals from a supply of water to "soften" the water. A pipe 12 supplies raw water from any suitable source and constitutes a portion of a pipe network, as shown, to supply water to the system. Treated or softened water is withdrawn from the system through a pipe 14 and a further pipe 16 provides communication with a suitable supply of brine or the like for regenerating the softening material in tank 10. The distributing pipe network includes, in the embodiment illustrated, six valves identified by Roman numerals I through VI. Each of the valves I through VI is fluid actuated and may be of any conventional or known type wherein the introduction of pressure fluid to a control chamber thereof (not shown) acts upon a diaphragm or equivalent structure to close the valve.

As is evident, when valves I and IV are open and the remaining valves closed, raw water may flow through pipes 12, 18, valve I, and pipes 20 and 22 into tank 10. Treated or softened water is then withdrawn from tank 10 through pipes 24, 26 and 14. The apparatus is operated with the valves in the described condition until such time as it becomes necessary to regenerate material in tank 10, at which time the first step consists of "backwashing" the tank by opening valves II and V and closing all remaining valves. With the valves in that condition, raw water flows through pipes 12, 42, 28, valve II, pipes 30 and 24 into tank 10 and then out through pipes 22, 32 and valve V to waste. The tank is thus backwashed for a predetermined length of time after which the valves are manipulated to open valves III and VI and close the remaining valves. With valves III and VI open, raw water flows through pipes 12 and 34, through valve III and through ejector 36 wherein the stream of raw water entrains brine from pipe 16 and carries that brine through pipe 38 into tank 10 to "regenerate" the water softening material therein. The waste products of the regenerating step flow out of tank 10 through pipe 24, then through pipe 40 and open valve VI to waste. After the softening material is regenerated for the required length of time, the valves are manipulated to open valves I and VI and close all remaining valves, whereupon raw water again flows through pipes 12, 42 and 18, valve I and then through pipes 20 and 22 to tank 10 and from tank 10 through pipes 24 and 40 to waste. This portion of the cycle rinses the regenerated softening material to remove the brine and other regeneration products. After the desired rinsing has been performed the valves are again returned to their original condition, that is, valves I and IV are opened and the remaining valves closed to thus return the apparatus to its original or service condition.

The present invention deals particularly with a control device for automatically controlling the operation of valves I through VI in the manner hereinabove described and to accomplish that control automatically in accordance with a predetermined time program. The control device is arranged to deliver pressure fluid through conduits 44, 46, 48, 50, 52 and 54 at the required time intervals or to connect those conduits with a drain 56 in the desired order and at the desired time intervals.

To effect delivery of pressure fluid through or venting of the conduits 44—54, the invention contemplates a rotary pilot valve illustrated in more detail in FIGS. 6 through 9.

Referring now particularly to FIGS. 6, 7 and 8, the pilot valve comprises a distributor plate 58, shown in plan view in FIG. 7. The distributor plate 58 is provided with a raised central boss defining an upper flat surface 60, preferably only slightly raised above the surface of the remainder of the plate and provided with a plurality of openings 62, 64, 66, 68, 70 and 72 therethrough. It will be clear from FIG. 7 that the openings 62, 64 and 70 are arranged on a circle concentric to the central opening 72 whereas openings 66 and 68 are arranged on a second circle of smaller radius also concentric about the opening 72. A manifold plate 74 is secured to the undersurface of distributor plate 58 and is provided with openings 76 corresponding to and aligned with the openings 62—72 shown in FIG. 7. The manifold plate 74 is also provided with a counterbore 78 aligned with each of the openings therethrough. The conduits 44—54, previously described, extend into the counterbores 78 wherein they are soldered or otherwise affixed. The counterbore aligned with central opening 72 receives the drain conduit 56, referred to in connection with FIG. 1. A further conduit 80 (see FIG. 1) is connected through the manifold plate 74 and a passageway (not shown) terminating in an inlet port 82 (FIG. 6) in a recess 84 in body member 86, to be more fully described hereafter. The conduit 80 is connected in any suitable manner to the raw water pipe 12 whereby to supply fluid under pressure to the pilot valve.

A rotary pilot disc 88 (see also FIG. 8) is provided with a plurality of openings 90 and 92 therethrough. The openings 90 are arranged on a circle corresponding in radius to the circle on which openings 62, 64 and 70 (of distributor plate 58) are located, whereas the openings 92 are arranged on a smaller circle corresponding to the smaller circle of FIG. 7. The pilot disc 88 is rotationally supported on the surface 60 about an axis concentric to the circles just described whereupon rotation thereof causes the openings 90 and/or 92 to be aligned with corresponding openings 62—70 previously described in a step-by-step manner and the angular spacing and positioning of the described openings in the distributor plate 58 and in disc 88 predetermines the order of operation of the valves I through VI and predetermines which valves are open or closed at each step. The pilot disc 88 is provided with a further opening through its lower face at the center thereof and constituting a vent port 94. That opening does not extend completely through the pilot disc 88 but communicates with transverse passageways 96 which, in turn, communicate with downwardly directed ports 98 and 100. It is to be noted that the ports 98 and 100 are also arranged on the same circles as the openings 90 and 92 but do not extend completely through the disc 88.

Thus it will be seen that those openings, 62—70 (of plate 58), which are aligned with any of the ports 98 or 100, serve to vent their corresponding valves whereas those ports 62—70 which are aligned with any of the openings 90 or 92 are in communication with the space above the pilot disc 88 and, as will be shown hereafter, are supplied with pressure fluid whereby their corresponding valves are actuated to closed condition.

With reference to the previously described sequence of operation of the valves I through VI for effecting a cycle of operation of the apparatus of FIG. 1, and with reference to the chart of FIG. 11, and particularly those columns under "Valves," it will be seen that valves II and V are in exactly the same condition of operation at each step during the cycle, i.e., they are both either simultaneously open or closed. Therefore, it is not necessary to provide separate openings in distributor plate 58 for each of those valves but they may both be connected to the same opening. To this end, conduits 48 and 54 are both supplied with pressure fluid by a conduit 102 which, in turn, communicates with the opening 62 of FIG. 7. The opening 64 communicates through conduit 50 to valve III. Opening 66 communicates through conduit 44 to valve VI. Opening 68 communicates through conduit 52 to valve I and opening 70 communicates through conduit 46 to valve IV. By reference to the arrangement of openings and ports shown in FIGS. 7 and 8, it will be apparent that, with the pilot disc 88 in a position where the ports 98 thereof overlie and communicate with openings 66 and 68 in distributor plate 58, the valves will be actuated to the condition indicated opposite pilot position No. 5 (chart of FIG. 11) wherein valves I and VI are open. It will also be evident that step-by-step rotation of the pilot disc 88 about the axis of opening 72 and port 94, through ⅙ of a revolution, will bring the pilot disc 88 to the end of its cycle as indicated by "0" of the chart and that subsequent steps, through ⅙ of a turn each, will sequentially position the ports and openings to produce the sequence of operations previously described and as indicated on the chart of FIG. 11. It is to be noted that "OP." (in the chart of FIG. 11) shows the corresponding valve to be open whereas no legend shows the valve to be closed.

The lateral passageways 96 in pilot disc 88 extend through the outer periphery thereof but are closed by a hollow cylindrical member 104 surrounding the periphery of the upper portion of the disc 88 and soldered or otherwise sealed thereto. The upper portion of the cylinder 104 extends substantially above the disc 88 and is provided with diametrically opposed vertical slots 106. The body member 86, previously referred to, is secured to the distributor plate 58 and manifold 74 by means of bolts 108 or the like and gaskets or sealing means 110 and 112 are positioned as shown to effectively seal the assembly and to position the recess 84 in enveloping relation to the pilot disc 88 and cylindrical member 104 to thereby define a closed chamber 114 into which the supply port 82 opens. Clearly, the chamber 114 will be filled with fluid under pressure supplied through conduit 80 from the raw water source and that fluid under pressure constitutes the source of pressure for distribution through openings 90 and 92 to the valves to be closed.

A shaft 116 extends through a vertical opening 118 in body 86 and has a cylindrical head member 120 fixed thereto within chamber 114 by means of a pin 122. The pin 122 extends radially of the shaft 116 and through the diametrically opposed slots 106 to provide rotational drive from the shaft 116 to the pilot disc 88. The head 120 is positioned within cylinder 104 and serves to prevent undue lateral displacement of disc 88. The shaft 116 is provided with a reduced lower end portion 124 about which a compression spring 126 is positioned. The spring 126 reacts against a shoulder on the shaft 116 and/or head 120 and urges the pilot disc 88 downwardly into firm surface engagement with the surface 60 of the distributor plate 58. A washer 128 is provided between the head 120 and the body 86 and an O-ring seal 130 surrounds the shaft 116 and engages an undercut portion of the body 86 around opening 118 and cooperates with washer 128 to seal that opening against loss of pressure therethrough from chamber 114.

The body 86 is provided with a transverse surface 132 and spaced upstanding leg portions 134 (see also FIG. 9). The shaft opening 118 extends through the surface 132 and the shaft extends therethrough and has affixed to its upper end a head device 136 by means of a dog screw 138. A washer 139 serves as a thrust bearing between head device 136 and surface 132. The dog screw 138 is so positioned that the threaded opening in which it is mounted extends through a peripheral portion of the head device 136 and is visible, from the left of FIG. 6, between the legs 134 and constitutes an indicator to indicate that the pilot disc 88 is in a predetermined position. That position corresponds to the "0" position of FIG. 11 and constitutes the position for normal operation of the water softening apparatus wherein valves I and IV are open. The peripheral portion of the head device 136 can be seen in FIGS. 1 and 2 and serves as a base upon which to provide further indicia indicating successive positions of the pilot valve.

The head device 136 is provided with an outwardly extending flange portion 140 which in turn is provided with a circumferential notch 142 (see FIG. 9). The ends 143 and 145 of notch 142 constitute cams for actuating a switch to be described later.

The head device 136 is further provided with a central upstanding boss 144 upon which an indexing disc 146 is mounted. The indexing disc 146 is provided with six notches 148 (see FIG. 9) equally spaced about its periphery and successively engageable by a spring detent 150 fixed to one of the body legs 134 by a screw 152 or the like. The spring detent 150 serves to hold the pilot disc 88 in successive positions of rotation defining the sequential steps of its cycle. Opposite the notches 148, as shown in FIG. 9, the numerals appearing in dotted circles indicate the positions of the valve as identified by corresponding numerals in the chart of FIG. 11. The peripheral portion of the head device 136, previously referred to, is provided with numerals below the notches 148 corresponding to the position numerals shown in FIG. 9. Thus, the numeral visible from between the legs 134 from the forward part of the apparatus (from the left of FIGS. 6 and 9) indicates the position of the pilot valve in its cycle.

An upper member 154 is mounted on central boss 144 of head device 136 and is also provided with a peripherally flanged portion 156 which is in turn provided with a peripheral notch 158 angularly displaced from the notch 142 and provided with cam ends 159 and 161, as seen in FIG. 9. A one-way-clutch driven member 160 is positioned on the member 154 and the entire assembly comprising clutch member 160, member 154, indexing member 146 and head device 136, are all held in assembled relationship and against relative rotation by means of eccentric lock pins 162.

The upwardly extending legs 134 of body member 86 terminate in an upper transverse member 164 constituting a support for a rotary solenoid device 166. The rotary solenoid device is mounted on the body member 164 by bolts 168 and is provided with a rotary armature having a driving shaft 170 extending downwardly in axial alignment with the shaft 116. The rotary solenoid 166 may be of any suitable or conventional type wherein delivery of an electric pulse thereto causes its armature and shaft 170 to rotate through a portion of one rotation and wherein cessation of the electric pulse releases the armature to the action of a spring or the like (not shown) to restore it to its original position. The structural details of the rotary solenoid will not be set forth herein since they are well known and such devices are readily obtainable on the market. However, it is contemplated that the rotary solenoid be provided with a hand knob 172 whereby its armature and shaft 170 may be rotated through one step without applying an electric pulse to the windings thereof.

A driving disc 174 is fixed to the armature shaft 170 and drivingly engages a driving clutch member 176. The driving clutch member 176 is freely slidable axially of the shaft 170 but is held thereby in concentric relation to the previously described driven clutch member 160. The clutch member 176 is urged downwardly by means of a suitable leaf spring 178 or the like. The clutch members 160 and 176 are provided with cooperating clutch teeth 180 and 182 of such configuration that the driving member 176 is effective to drive the clutch member 160 in only one direction. The spring 178 maintains the clutch members in contact at all times and the teeth 180 and 182 are such in number and shape that rotation of the shaft 170 through an angular movement of 60 degrees rotates the clutch member 160 and pilot disc 88 through the same angle whereupon return of the shaft 170 to its original position causes clutch member 176 to "cam" over the teeth 182 and engage the next rearward teeth for a further rotational advance of the pilot disc upon delivery of the next electric pulse to the solenoid winding.

The transverse member 164 of the body 86 extends rearwardly, as at 184 and serves to support, by means of screws 186, a pair of switches 188 and 190. The switches 188 and 190 will be described in greater detail later but each includes an actuating member. The actuating member of switch 188 is provided with a roller 192 bearing against the periphery of the flange 156 and the actuator for switch 190 is provided with a roller 194 bearing against the periphery of the flange 140. Each of the switches 188 and 190 is a 2-position switch, as will be more fully described later.

As previously stated, the solenoid 166 is operated by successive electric pulses to advance the pilot disc 88 through successive steps of its cycle. The means for producing the electric pulses includes a timing mechanism, generally indicated by numeral 196 (FIGS. 1 through 5) and includes an electric motor 198 having an output shaft 200 on which a pinion 202 is fixed. The pinion 202 meshes with a gear 204 rotatably mounted on a supporting structure 206 comprising front and rear plates 207 and spacers 209. The gear 204 is fixed on a shaft 208 (FIG. 5) on which a primary disc 210 is also fixed. The primary disc 210 is provided with an axially extending eccentric pin 212 thereon. A second shaft 214 is rotatably mounted on the supporting structure 206 and has a ratchet wheel 216 fixed thereon and a pinion 218 also fixed thereon. A spring detent 220 is fixed to a bracket 222 which in turn is mounted on the supporting structure 206 and the free end of the spring detent 220 is formed to engage the ratchet wheel 216 to releasably hold the same in a fixed position in an obvious manner. The ratchet wheel 216 is so positioned that its peripheral teeth, on the side thereof nearest the shaft 208, extend into the circular path of movement of the eccentric pin 212. Thus, as motor 198 rotates constantly it drives the disc 210 and pin 212 at a uniform rate. The pin periodically engages the ratchet wheel 216 to rotate the same through a single step and thus rotate pinion 218 in a step-by-step manner.

The shaft 208 rotatably supports a sleeve 224 on which is mounted a second disc 226 coaxial to and closely adjacent the primary disc 210. A gear 228 is also fixed to the sleeve 224 and meshes with the pinion 218. The sleeve 224 is further provided with a program disc 230 mounted thereon outwardly of the front plate 207. From the structure thus far described, it will be obvious that the program disc 230 is rotated through a single step during a relatively short time interval during each rotation of the primary disc 210 and is held stationary throughout the remainder of one cycle of rotation of the primary disc. The program disc 230 is provided with a plurality of radial notches 232 in its outer periphery arranged to releasably receive program pins or cam elements 234. The elements 234 may be selectively positioned at any desired position on the periphery of the program disc 230 and angularly spaced apart distances representing desired time intervals.

The motor 198 is of a type which rotates at a uniform speed and the gear ratios are chosen (in the illustrated example) so that the primary disc 210 makes one complete revolution in a predetermined time interval, for instance, one minute. For example, the program disc 230 may be provided with one hundred and twenty radial notches 232 whereby the program disc is advanced in a step-by-step manner through an angle corresponding to the spacing between notches 232 or, in other words, the disc 230 may be advanced 1/120 of a revolution at the end of each minute. Thus the program disc 230 takes two hours to complete a cycle of operation comprising one full revolution.

The primary disc 210 and the driven disc 226 are each provided with a single peripheral notch 236. A motor control switch 238 is mounted on the supporting structure 206 to position an inturned end of its actuator 240 adjacent the periphery of the discs 210 and 226. The actuator element 240 is biased toward the disc peripheries and when the notches 236 of both discs occupy the position shown in FIG. 5 the actuator 240 moves inwardly to actuate switch 238 to a first condition. As long as either of the discs 210 or 226 is in a position other than that shown in FIG. 5, the actuator 240 is forced outwardly to actuate the switch 238 to a second condition. The purpose for the switch 238 will be more fully described later. It is to be understood that the program disc 230 may be provided with suitable indicia 242 (FIG. 2) to facilitate setting of the program pins 234 and is also provided with an indicia 244 which occupies a predetermined or "off" position when the notches 236 are in the position indicated in FIG. 5. Reference hereafter to the "off" position of the program disc 230 will be intended to indicate that position in which the notches 236 are in the position of FIG. 5 and wherein switch 238 is actuated to its first condition referred to above.

A trip lever or stepping device 246 (FIG. 2) is pivoted to the supporting structure 206 on an axis defined by shaft 248 to which it is fixed.

Figure 2:
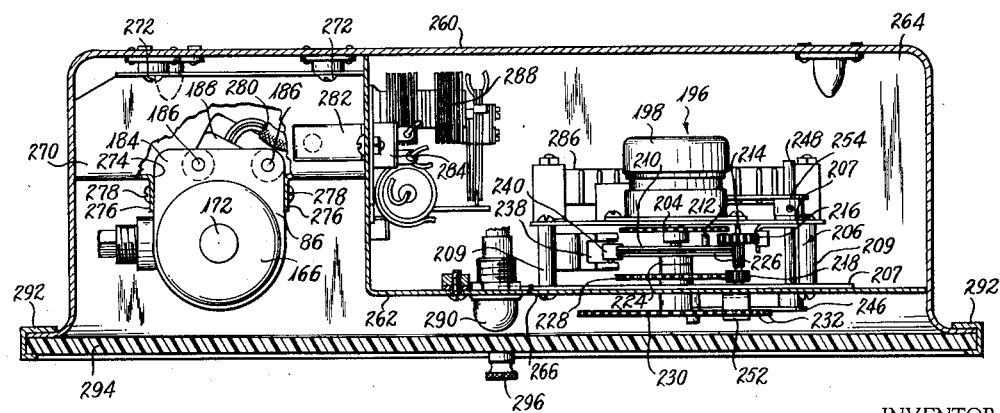
FIG. 2 is a front elevational view of the control device of FIG. 1, shown on an enlarged scale.
Figure 2:
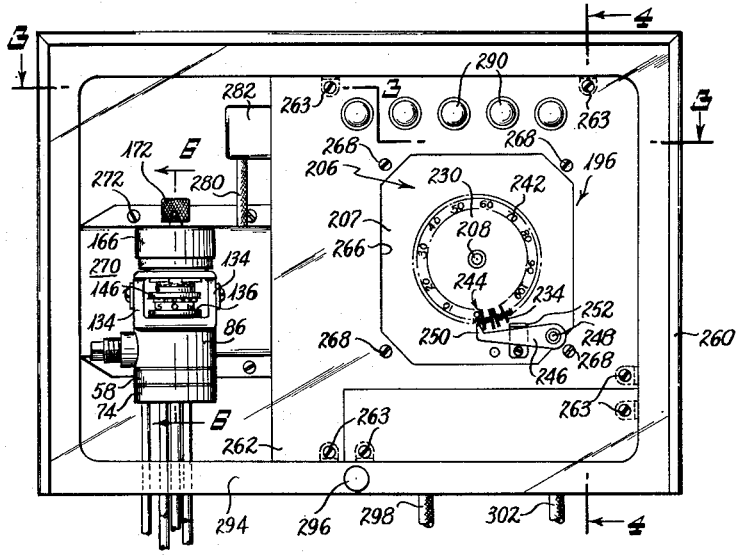
Figure 4:
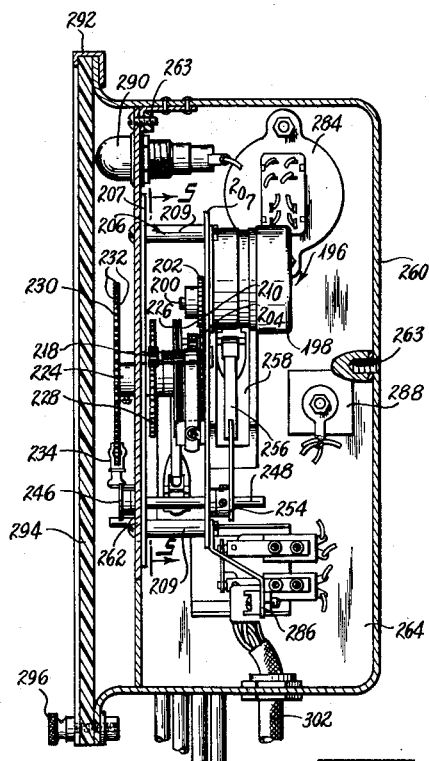
FIG. 4 is a vertical sectional view taken substantially along the line 4—4 of FIG. 2 and showing the parts on an enlarged scale.
Figure 5:
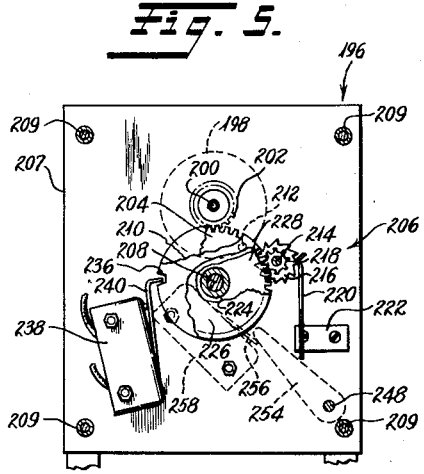
FIG. 5 is a fragmentary sectional view taken substantially along the line 5—5 of FIG. 4.

The free end of the trip lever 246 is formed as a cam 250 normally positioned in the path of movement of the program pins 234. A suitable stop member 252 is fixed on the supporting structure 206 to limit the inward movement of the cam 250. The shaft 248 extends rearwardly through the supporting structure 206 and has a lever 254 fixed thereto. The lever 254 extends into contact with an actuator member 256 of an interval switch 258 also mounted at the rear of the supporting structure 206 on the rear plate 207. Thus, it will be seen that each time a program pin 234 passes the position of cam 250, the latter is displaced outwardly to rotate shaft 248 in a counterclockwise direction as seen in FIGS. 2 and 5 and thereby momentarily actuate or close the switch 258. The arrangement is such that the sequential positions assumed by the program disc 230 positions adjacent notches 232 thereof on opposite sides of the tip of the cam 250 whereby the cam may move to its inner position to open switch 258 between adjacent program pins 234. By this arrangement the switch 258 is held closed only during the very short time interval necessary to move the program disc 230 from one position to its next position. As will be described, the switch 258, when energized and closed, completes a circuit to deliver a pulse to the solenoid 166. It is advantageous that the switch 258 be closed only momentarily to thereby limit the duration of the pulse delivered to the solenoid to guard against undue heating of the solenoid coil and possible damage thereto. By the arrangement just described, the switch 258 is closed during an interval of time of only about ten seconds.

The pilot valve assembly and the timing mechanism, both previously described, are mounted in a suitable housing or casing 260. The housing 260 is provided with an internal partition 262 (see FIGS. 3 and 4) held in place by screws 263 defining a compartment 264. The partition 262 is provided with an opening 266 in the front face thereof behind which the supporting structure 206 for the timing mechanism is positioned. The timing mechanism may thus be removably mounted in the housing 260 by means of screws 268 or the like. The housing is also provided with a bracket structure 270 removably mounted therein by means of mounting screws 272 and provided with an opening in its front face at 274 (FIG. 3). Ears 276 (FIGS. 3 and 9) extend forwardly from the opposite sides of the opening 274 and engage the sides of the body member 86 of the pilot valve assembly. Screws 278 secure the pilot valve assembly to the ears 276. Thus the pilot valve assembly and bracket 270 may be readily removed from the housing 260 for replacement or repairing. Since the pilot valve assembly includes electrical devices such as the solenoid 166 and switches 188 and 190, the conductors connected to those devices are formed into a cable 280 and are, in turn, connected to a plug member 282 having suitable connector prongs (not shown) by which the plug may be inserted in a corresponding electrical receptacle or jack 284 mounted on the partition 262 (see FIGS. 3 and 4).

Within the compartment 264, the housing 260 is provided with a terminal strip 286 of insulating material provided with binding ports to which the various necessary electrical conductors may be connected in the circuits to be described. The compartment 264 also houses a suitable power pack including a rectifier 288 for supplying direct current to the solenoid 166. The partition wall 262 also supports a plurality of indicator lights 290 which will be further described later.

The housing 260 is provided with an open front bounded on its upper edge and side edges by an inwardly facing channel structure 292 adapted to receive a transparent cover plate 294 which may be releasably secured in position therein by a thumb screw 296. Thus it will be obvious that the transparent cover plate 294 may be removed at will to provide access to the pilot valve assembly or timer mechanism.

FIG. 1 shows a suitable power supply cable 298 provided with the usual plug 300 for connection to a suitable source of electrical energy. The conductors comprising the cable 298 are connected to the terminal strip 286 in a manner to be referred to in connection with the wiring diagram of FIG. 10. A further cable 302 (see FIG. 1) extends from the housing 260 and comprises a plurality of conductors also connected to the terminal strip 286 and connected to a pair of switches in a housing 304 adapted to be mounted in any suitable or convenient location relative to the housing 260 or the water softening apparatus shown. The housing 304 houses the two switches shown, of which switch 306 is a starting switch and 308 is a "fast rinse" switch, both of which will be further described.

Referring now to FIGS. 5 and 10, the motor switch 238 includes a movable blade 310 movable by the actuator 240 to engage either a contact A or a contact B, depending upon whether the actuator is within the aligned notches 236 or bearing against the periphery of either of the discs 210 or 226. The motor 198 and program disc structure are merely scematically shown in FIG. 10. The interval or stepping switch 258 is provided with a swingable blade 312 adapted to be engaged with a single contact therein when the cam 250 is moved outwardly by a program pin.

Referring now to FIGS. 6, 9 and 10, the switch 188 comprises what may be termed an auxiliary switch and is provided with a swingable blade 314 arranged to engage a contact E when its roller 192 engages the periphery of the cam 156 and to engage a contact F when its roller 192 is in the peripheral notch 158. The notch 158 is so angularly positioned that the roller 192 is in that notch when the pilot valve disc 88 is in its No. 5 position, as shown in the chart of FIG. 11. FIG. 9 shows the pilot valve in its "0" or service position and the roller 192 engaging the periphery of the flange 156, wherein the blade 314 is in contact with contact E. Reference to the chart of FIG. 11 indicates the positions of the blade 314 at each position of the pilot valve.

The switch 190 may be termed a sustaining switch and is provided with a movable blade 316 movable into contact with either terminal C or D (FIG. 10). The sustaining switch 190 is actuated by its roller 194 to position switch blade 316 against terminal C when the roller 194 engages the periphery of flange 140 and to engage contact D when roller 194 is in notch 142. As evident from FIGS. 9 and 11, roller 194 is in notch 142 only when the pilot valve is in its "0" or service position and engages the periphery of flange 140 at all other positions of the pilot valve.

It is to be noted that each of the contacts C, D, E and F of switches 188 and 190 constitute, in effect, separate "switches." It is to be further noted that the positive side of the line (FIG. 10) is connected to only the blades of switches 188 and 190, and therefore, all the electrical circuits are controlled by the position of the pilot valve.

By continued reference to FIG. 10, it will be seen that a relay 318 is provided in the circuit shown and the winding of the relay 318 is arranged in parallel with the timer motor 198. The relay 318 actuates a contactor 320. It will be obvious that when the timer motor 198 is operating the relay 318 is also energized and holds the contactor 320 in the full line or "On" position shown in FIG. 10. At all times when the motor 198 is de-energized, the relay 318 is also de-energized and its contactor 320 moves to the dotted line or "Off" position of FIG. 10.

The indicator lights 290 shown in FIG. 10 comprise 1g (green) and 2r (red) to indicate the condition of the timer motor 198. The light 2r is on at all times when the motor is running, whereas 1g is on and 2r is off when the motor 198 is de-energized. Indicator lights 3g (green) and 4r (red) indicate the condition of the pilot valve. The light 3g is on when the pilot valve is in its "0" or service position, whereas 3g is off and 4r is one when the pilot valve is in all positions other than its "0" or service position. The indicator light 5r (red) is on only when the pilot valve is in its No. 5 or "rinse" position.

Assume that the pilot valve is in its "0" (initial) or service position and that the program disc is in its off position wherein blade 310 of the motor switch 238 engages contact B thereof. Under those conditions the control device is not running and the apparatus valves are in the condition shown opposite the "0" position on the chart of FIG. 11 with the apparatus in "service." The apparatus is thus being operated to soften raw water and deliver treated water through pipe 14. When it becomes necessary to regenerate the softening material in tank 10, a cycle of operation may be started by either closing starting switch 306 or by manually rotating the pilot valve to its No. 1 position. The determination of when a cycle of operation is to be started may be made by any means, for instance, by observation of the hardness condition of the treated water, and the starting switch 306 may be manually closed. On the other hand, automatic means (not shown) may be resorted to to determine when regeneration is necessary and such means may automatically close a switch corresponding to the starting switch 306. It will be noted from FIG. 10 that when the control device is in the condition assumed, with the pilot valve in its "0" position, the contactor 320 of relay 318 is in its dotted line position, thus energizing starting switch 306 to render the same effective, when closed, to complete a circuit through the power pack and solenoid to deliver a pulse to the latter and thereby advance the pilot valve to its No. 1 position. As soon as the pilot valve is advanced to its No. 1 position the sustaining switch 190 is actuated to the terminal C, whereas the auxiliary switch 188 remains at terminal E. Such actuation of the switch 190 completes a circuit through motor switch terminal B and timer motor 198 to thereby start the timer in operation. At the same time the relay 318 is energized which thus de-energizes the starting switch and the starting switch remaining de-energized and ineffective throughout a full cycle of the pilot valve. It is also to be noted that the contactor 320 of the relay 318 when in its "Off" position, de-energizes the interval switch 258 so that inadvertent or even intentional actuation of the cam 250 will not deliver an electric pulse to the solenoid 166. When the motor 198 is in operation and relay 318 energized, the contactor 320 is moved to its "On" position and thus energizes interval switch 258. It is to be assumed that the program pins 234 are all positioned in the desired positions on program disc 230 so that upon starting a cycle of operation of the timing device, as just described, the program disc will be advanced in a step-by-step manner to periodically actuate the cam 250 and energize solenoid 166 to advance the pilot valve through successive steps of its cycle at time intervals predetermined by the setting of the pins 234. By way of example, it may be assumed that the pilot valve remains in its No. 1 position for about one minute, in its No. 2 position for three minutes, in its No. 3 position one minute, and in its No. 4 position four minutes. It is to be noted that positions Nos. 1 and 3 are positions in which all valves of the apparatus are closed. It is deemed advisable to close all valves before actuating them to their next successive condition and the minimum time interval for actuation of the program disc through successive steps is one minute in the example given since it takes the motor-driven primary disc 210 one minute to make a full revolution to again actuate the ratchet wheel 216. The switches 188 and 190 remain in the condition they assumed upon movement of the pilot valve to its No. 1 position throughout travel of that pilot valve through its No. 4 position (see FIG. 11). However, as soon as timer motor 198 started to operate, its primary disc 210 rotated sufficiently to move its notch 236 out of the position suggested in FIG. 10 and thereby the motor switch 238 was immediately actuated to position its blade 310 against terminal A. However, it will be obvious from the wiring diagram of FIG. 10, that with blade 310 against terminal A a circuit is completed through terminal E of auxiliary switch 188 to maintain the motor 198 in operation.

When the switch 258 is closed to deliver a pulse to solenoid 166, while the pilot valve is in its No. 4 position, that pulse moves the pilot valve to its No. 5 position at which time roller 192 of auxiliary switch 188 drops into notch 158 of flange 156 and thereby moves blade 314 to terminal F of that switch, de-energizing the timer motor 198. It is to be remembered that at this time motor switch blade 310 is in contact with terminal A. When blade 314 contacts terminal F of switch 188, fast rinse switch 308 may then be energized and made effective to deliver a pulse to the solenoid 166 independently of interval switch 258. The particular water softening agent employed will predetermine the duration of each step of the cycle through step No. 4. However, the length of time during which the pilot valve is in its No. 5 position and during which a final rinse is being accomplished, may vary with different installations and should be sustained only until the softening agent has been sufficiently rinsed. The sufficiency of the rinse may be determined by an outside control device (not shown) which may, in turn, be arranged to automatically actuate the fast rinse switch 308 or the fast rinse switch 308 may be closed manually upon determination in any manner that the rinse is complete. Closing of fast rinse switch 308 completes a circuit through the power pack and solenoid 166 to thereby advance the pilot valve from No. 5 position to its "0" or service position and the end of its cycle. It will be obvious from the chart of FIG. 11 and the wiring diagram of FIG. 10 that such final advance of the pilot valve will return switches 188 and 190 to the condition shown opposite the "0" position of the pilot valve, as indicated in the chart of FIG. 11.

In the example given the time required to complete a full cycle of operation of the pilot valve extended over a relatively few minutes whereas the time for completion of a full cycle of rotation of the program disc 230 is two hours. Therefore, even after the pilot valve has been returned to its "0" position a circuit is maintained through the timer motor 198 and contact E of switch 188 to keep the timer motor in operation, and the starting switch de-energized, until the notches 236 have again reached the "off" position of FIG. 5. At that time motor switch 238 is actuated to position blade 310 against contact B, which is in an open circuit at that time since blade 316 of sustaining switch 190 is in its D position. The timer motor 198 thereupon stops and the entire control device is rendered inactive until it is again started for another cycle of operation. If it is undesirable to wait the remainder of the two hours for completion of the cycle of the program disc, the latter may be manually rotated in a forward direction to accelerate completion of its cycle. The structure described in connection with FIGS. 3, 4 and 5 obviously permits manual advance of the program disc at any time.

It will also be obvious that a cycle of operation of the control device may be initiated manually by merely rotating pilot valve knob 172 to advance the pilot disc 88 one step to its No. 1 position. Such movement of the pilot valve actuates the switches 188 and 190 in the manner described to automatically start the timer motor and to sustain operation thereof throughout a full cycle. In fact, the pilot valve may be manually actuated to each successive step in the event of power failure.

Also, it will be obvious that since the program disc 230 operates for two hours and since a cycle of operation of the pilot valve requires only a fraction of that time, additional devices may be incorporated in the apparatus (although not shown) to intercept the circuits shown in FIG. 10 and render a further or different water softening or processing apparatus subject to control by the program disc 230 while the apparatus described and shown herein remains in service.

While the specific example described herein relates to a water softening apparatus employing six operable valves, obviously the instrumentalities controlled by the pressure fluid delivered from the pilot valve need not be valves as such but may be any other hydraulically-operated devices and may be provided in different number than in the specific illustration. For instance, the apparatus may readily be adapted to the control of apparatus employing a lesser or greater number of valves or equivalent devices than shown herein and may be adapted to the control of diatomaceous filters, 2-bed deionizers and similar apparatus. When it is desired to employ the control mechanism described herein for the control of other apparatus involving a different number of valves or the like devices, designed to be operated according to a different program schedule, it will be necessary to provide a manifold plate 74, a distributor plate 58, and a pilot disc 88 having different opening and passage arrangements therein. Such alternative arrangements may be designed and fabricated and it is thereupon only necessary to mount such a pilot valve assembly in place of that shown herein since the latter is shown and described as being readily removable from the supports and circuits. To this end only short lengths of conduit are mounted in the manifold plate 74 and they are provided with suitable fittings 350 (FIG. 1) for connection to conduits 44, 46, 50, 52, 56 and 102. In like manner, a timing device having different time cycles from that described may also be provided, it being only necessary to replace the motor 198 and the gearing associated therewith to provide a timing mechanism having a minimum time interval for disc 210 which may be as low as a half minute or as high as two minutes.

By way of further explanation of FIG. 11, the alphabetical legends in the motor switch, auxiliary switch and sustaining switch columns indicate the correspondingly identified contacts of those switches with which their blades are in engagement when the pilot valve is in its indicated position. In the starting switch and fast rinse switch columns, "OPER." means operative (energized) and "INOP." means inoperative (de-energized). In the indicator lights columns, blank spaces signify that the corresponding lights are off.

The single specific embodiment shown and described herein is merely illustrative of the principles of the invention and is not to be considered as limiting the invention thereto. It is intended that the invention cover other embodiments falling within the scope of the appended claims.

I claim:

1. In apparatus for automatically controlling a cyclic process wherein an electric pulse-operated device is energized at predetermined time intervals through a cycle of operation, a timing motor, a rotary program disc having peripherally spaced notches to selectively receive trip means, trip means in one or more of said notches, a normally open pulse switch provided with an actuator having a movable portion arranged in the path of movement of said trip means, releasable indexing means normally holding said program disc stationary only at sequential positions wherein said movable portion is between adjacent notches, and driving means operated by said motor for sequentially rotating said program disc one step at predetermined time intervals, each step being sufficient to move a trip member past the actuator in the path thereof in a single movement to momentarily close and then reopen the switch actuated thereby.

2. Apparatus as defined in claim 1 wherein said driving means comprises a rotary member driven by said motor at a uniform rate and including a pin eccentrically mounted on said member to thereby move on a circular path, a ratchet wheel mounted with a peripheral portion thereof in the path of movement of said pin, and means drivingly connecting said ratchet wheel to said program disc.

3. Apparatus as defined in claim 1 wherein said program disc is mounted for free manual rotation in one direction independently of said driving means.

4. In apparatus for automatically controlling a cyclic process wherein an electric pulse-operated device is energized at predetermined time intervals through a cycle of operation; a timing motor; a rotary program disc having peripherally spaced trip means; a pulse switch provided with an actuator having a movable portion arranged in the path of movement of said trip means; releasable indexing means normally holding said program disc stationary at sequential positions wherein said movable portion is between adjacent trip means; and driving means operated by said motor for sequentially rotating said program disc one step at predetermined time intervals, said driving means comprising a primary rotary disc driven by said motor at a uniform rate, eccentric means on said disc and means responsive thereto for rotating said program disc one step during a minor portion of each revolution of said primary disc, a second disc rotationally fixed to said program disc coaxial to and adjacent said primary disc, a cam device at one point on the periphery of each of said discs, and a single means at a fixed position adjacent the peripheries of said discs and actuatable in response to both said cam devices, when at said position, to de-energize said motor.

5. Apparatus as defined in claim 4 wherein said motor is an electric motor, said single means comprising a motor control switch having an actuator member engaging the peripheries of said discs, and said cam devices each comprising an undulation in the periphery of its corresponding disc.

References Cited in the file of this patent

UNITED STATES PATENTS

| | | |
|---|---|---|
| 746,998 | Schmidt | Dec. 15, 1903 |
| 1,071,046 | Hall | Aug. 26, 1913 |
| 1,317,109 | Sohm | Sept. 23, 1919 |
| 1,570,685 | Larrabee | Jan. 26, 1926 |
| 1,865,604 | Yarnall | July 5, 1932 |
| 1,868,801 | Munz | July 26, 1932 |
| 2,254,795 | Daniels | Sept. 2, 1941 |
| 2,372,253 | Coren | Mar. 27, 1945 |
| 2,421,481 | Collins | June 3, 1947 |
| 2,442,835 | Allen | June 8, 1948 |
| 2,478,702 | Moody | Aug. 9, 1949 |
| 2,611,392 | Johnson | Sept. 23, 1952 |
| 2,661,060 | Otis | Dec. 1, 1953 |
| 2,738,807 | Addison | Mar. 20, 1956 |
| 2,776,009 | Tamburr | Jan. 1, 1957 |
| 2,851,099 | Snoddy | Sept. 9, 1958 |
| 2,874,773 | Lorenz | Feb. 24, 1959 |